Nov. 11, 1941.          J. C. WHITESELL, JR., ET AL          2,262,627
                              MANIFOLD
                        Filed Nov. 15, 1938              2 Sheets-Sheet 1
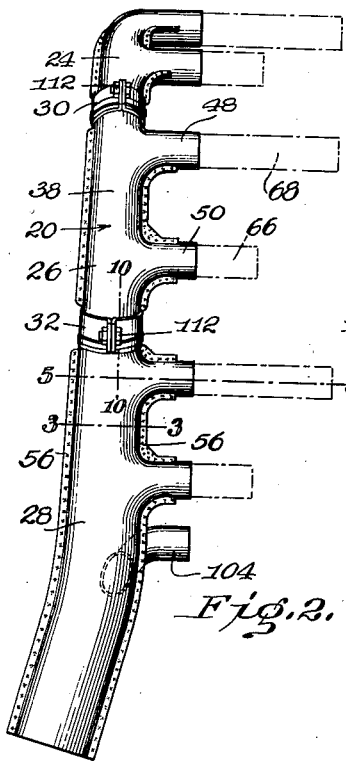
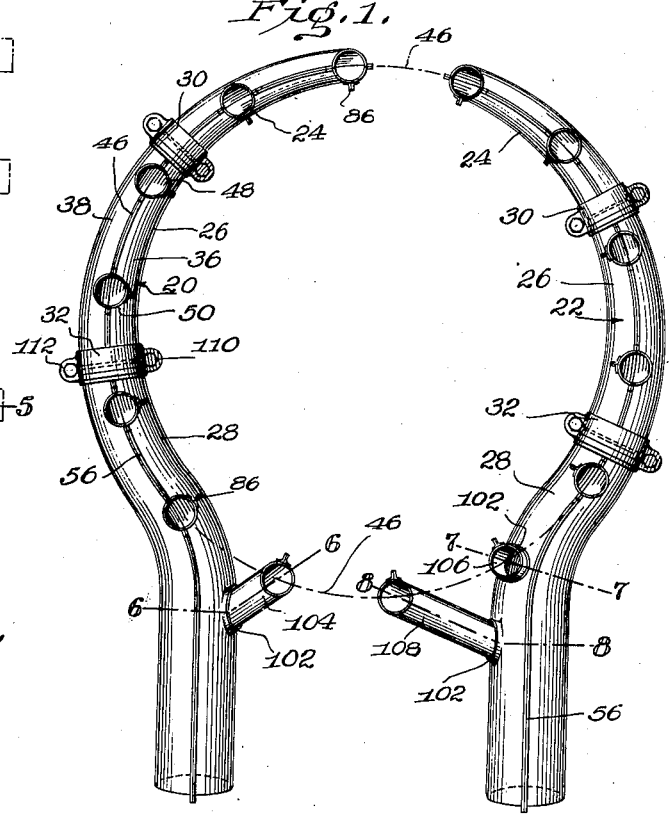
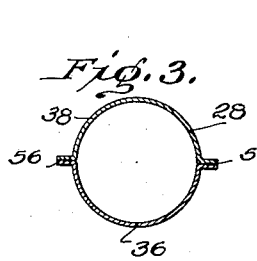
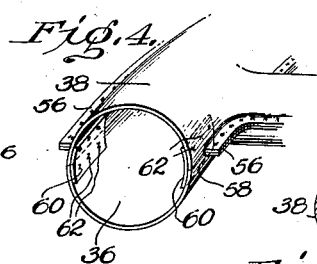
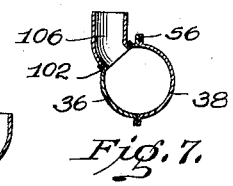
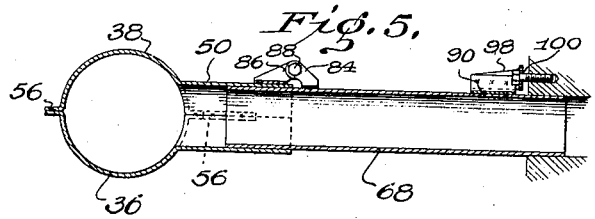
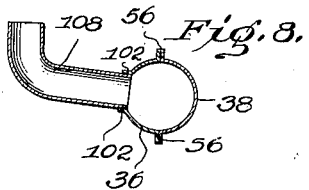
INVENTORS
*Enea Bossi* and
*John C. Whitesell Jr.*
BY
John P. Tarbox
ATTORNEY

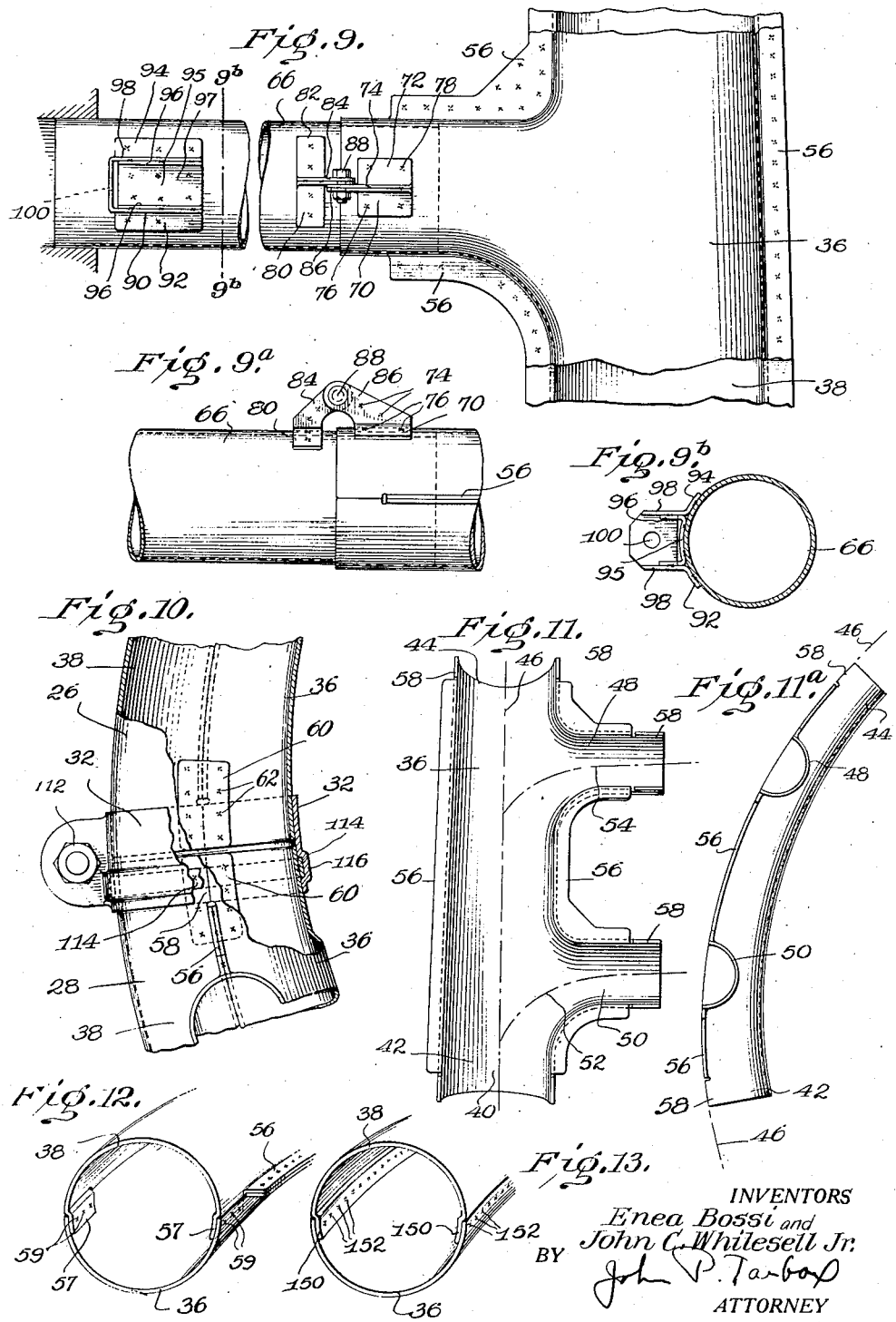

Patented Nov. 11, 1941

2,262,627

UNITED STATES PATENT OFFICE 2,262,627

MANIFOLD

John C. Whitesell, Jr., Norristown, and Enea Bossi, Philadelphia, Pa., assignors to Edward G. Budd Manufacturing Company, Philadelphia, Pa., a corporation of Pennsylvania Application November 15, 1938, Serial No. 240,450

3 Claims. (Cl. 285—210)

This invention relates to manifolds and more particularly to manifolds especially adapted for multi cylinder internal combustion engine exhaust manifolds.

The stresses, expansion and contraction of such manifolds heretofore in use, have produced serious difficulties in connection therewith, and particularly where such manifolds have been designed for aircraft use, where weight is an important factor, a serious problem is presented. By the present invention it is proposed to make such manifolds from stabilized stainless steel and to form the manifold into complementary parts spot welded together by which arrangement a manifold of increased strength, lightness and durability may result. The complementary sections may be stamped, pressed or drawn into shape without hammering and by forming the complementary sections so as to part upon the center plane of the branch conduits as well as the main conduit, the forming stresses are maintained at a minimum. If radially extending welding flanges be provided, the cooling fin effect thereof is of considerable advantage.

Accordingly, an object of the invention is to provide a manifold constructed from sections parting on planes passing through the axis of the various conduits whereby the sections may be readily shaped.

Another object of the invention is to secure the complementary sections together by spot welding thereby eliminating fatigue lines that are liable to crack.

A further object of the invention is to provide a novel manner for connecting a plurality of conduit sections in a manner to provide free expansion and contraction.

Yet another object of the invention is to provide a flanged and welded means for securing complementary sections together and for preventing leakage.

Still another object of the invention is to provide a manifold having a comparatively smooth internal conduit, whereby eddying and the skin resistance to gas flow are reduced to a minimum.

The above and other novel features of the invention will appear more fully hereinafter from the following detailed description when taken in connection with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views:

Fig. 1 is a front elevation of a manifold, particularly adapted for a radial engine.

Fig. 2 is a side elevation of the manifold, one side only being illustrated.

Fig. 3 is a section taken on the line 3—3 of Fig. 2.

Fig. 4 is a perspective illustration showing the method of finishing the end.

Fig. 5 shows a section taken through a branch conduit as on the line 5—5 of Fig. 2.

Figs. 6, 7 and 8 respectively show sections through branch conduits taken on lines 6—6, 7—7 and 8—8 respectively of Fig. 1.

Figs. 9, 9a and 9b are detailed views of the connecting and fastening means of Fig. 5.

Fig. 10 is a detailed view of the telescopic clamp and is shown in broken section taken substantially on line 10—10 of Fig. 2.

Figs. 11 and 11a are views of a segment of a section of the manifold.

Fig. 12 is a fragmentary view of an alternative end section.

Fig. 13 is a modified form wherein a lap joint is used between segments.

Referring to Fig. 1, there is illustrated a manifold composed of two arcuate portions 20 and 22, each composed of a plurality of aligned sections 24, 26 and 28, joined together by telescopic clamps 30 and 32. The manifold sections proper are formed preferably from stabilized stainless steel sheet, which steel due to the inclusion of small quantities of titanium or the equivalent, in addition to nickel and chromium, renders such steel proof against corrosion even when subjected to the high temperatures of internal combustion engines' exhaust manifolds.

Each section is composed preferably of two segmental portions, for example, section 26 is composed of segmental portions 36 and 38. In Fig. 11, a segmental portion 36 is shown in detail. Such a portion may be stamped, drawn, pressed or otherwise shaped so as to provide an arcuate sectioned portion 40 preferably tapering in radius from the end 42 to the end 44, the arcuate portion being shaped around a curved axis 46, the curved or circular shape thereof being shown in Fig. 1.

Branch conduits 48 and 50 are simultaneously pressed into each segmental part, the same being arranged so as to provide a circular conduit arranged around axes roughly indicated as at 52 and 54. These axes curve into the axis 46 of the main conduit in the direction of flow or increasing taper so as to reduce the extent of eddying of the exhaust gases. Each segment may form a half of the conduit or more than two segments may be employed as may seem feasible, but the edges of each segment are provided with integral radial flanges 56 adapted to abut flanges of the adjacent segments to afford spot welding of the segments together into a section. The flanges are preferably cut back as at 58 so that telescopic exterior sleeves may be placed thereon to connect one section with the adjoining section.

Upon securing two segments together by spot welding their flanges to form a conduit, it is preferable in order to cover any possible holes that might permit leakage to secure a small thin plate 60 adjacent the end of each section to cover up the slit which would be otherwise left adjacent where the flanges are cut away as at 58. This plate may be secured in place by a number of spot welds 62 as shown.

The branch conduits may be connected to the engine cylinders through short nipples or pipes 66 and 68, the same being telescoped within the branch conduits. To position the branch conduits with respect to pipes, brackets may be spot welded to each as illustrated in Fig. 9. The branch conduit brackets 70 and 72 are composed of angle members arranged back to back, and spot welded together at 74 while the other portions are spot welded to the conduit at 76 and 78. A similar pair of brackets 80 and 82 are provided and secured to the pipes 66 and 68. The brackets 80 and 82 and 70 and 72 have overlapping portions 84 and 86 respectively which are drilled for the passage of a suitable pin or other fastening means 88.

The other end of the nipple may be secured to the engine block by a bracket formed into a U 90, having flanges 92 and 94 spot welded to the nipple. A second U 95 is shown as reinforcing the U 90 by spot welding the base 97 thereof to the pipe and the sides 96 to sides 98 of the U 90. The end of the U 90 is perforated at 100 to receive a bolt or other engine securing means.

Where the contour of the manifold is such as to prevent stamping the branch conduits integrally thereinto, flanged holes may be provided as at 102, the flanges of which may be spot welded to inserted elbow connecting pipes 104, 106 or 108 depending upon the necessary shape.

To join the various sections together split clamps 30 composed of two identical sections bolted together at 110 and 112 are employed. To position the clamping members against axial sliding, an annular ring or band 114 is spot welded around one of the adjoining sections, and the clamp members are provided with a groove 116 complemental thereto and adapted to closely embrace the band. Thus the clamping members are fixed with respect to one section but slidable upon the other to permit expansion and contraction between the sections to offset contraction and expansion of each individual section.

An alternative construction for finishing the ends of sections that does away with the plate 60 may be formed as shown in Fig. 12. In this form, a portion of the radial flange 56 is provided with an offset 57 and extended under the adjacent segment and spot welded thereto as at 59.

In Fig. 13, the flanged joint employing spot welds in tension is shown as a lap joint with welds in shear, a portion of the segment 36 being extended as at 150 and offset and welded as at 152. Such a construction does not have the advantage of providing cooling fins in the form of the radial flanges provided for spot welding.

The modification shown in Figs. 1 and 2 has been designed to accommodate a fourteen cylinder radial engine, and the manifold has been broken up so as to accommodate two branch conduits, except at the lower ends. Any arrangement of course may be used as it will appear that for ease of assembly and disassembly as well as for accommodating expansion and contraction, various arrangements will be found expedient. The structure disclosed obviously may be used in connection with a multiple in line cylinder engine, or may be used for other purposes than exhaust manifolds.

The spot welds employed for securing the parts together will preferably be formed in accordance with the teachings disclosed in U. S. Patent No. 1,944,106 issued January 16, 1934, to Ragsdale. While such rapid welding is not essential, since carbide precipitation will not ordinarily take place in stabilized stainless steel, yet rapid welding with an absence of heating the surrounding steel will prevent any possibility of grain growth in the metal around each weld. On the contrary, gas welding or arc welding so thoroughly heats the metal to temperatures as high as 2600° F., for prolonged periods that extensive grain growth results, producing fatigue lines of weakness. This temperature is far in excess of manifold operating temperatures and by using spot welding such high temperatures are avoided and the incident grain growth is substantially negligible, and thus there results a manifold construction of greater strength. In fact by the use of spot welding in constructing such a manifold as is herein disclosed, the actual thickness of metal can be reduced thereby saving considerable weight, while retaining strength. The forming of the metal without hammering additionally maintains uniform high strength in the metal and is important in permitting thinner sections to be used.

Though a single embodiment of the invention with variations has been illustrated and described, it is to be understood that the invention is not limited thereto but may be embodied in various forms, shapes and arrangements. As many changes in construction and arrangement may be made without departing from the spirit of the invention as will be apparent to those skilled in the art, reference will be had to the appended claims for a definition of the limits of the invention.

What is claimed is:

1. An exhaust manifold comprising a plurality of aligned sections, each section composed of a plurality of segmental portions having mating radial flanges secured to one another by spot welding therethrough, said flanges terminating short of the ends of said segments, a telescopic joining sleeve clamped around the adjacent ends of adjacent sections and slidable axially with respect to one of them, and means for axially locating said sleeve with respect to one of the sections only.

2. An exhaust manifold comprising a plurality of aligned sections, each section being composed of a pair of segmental portions extending the length of the section, said segmental portions being mated and having marginal radial flanges and spot welds for securing the flanges of one segment to the flanges of the mating segment, said flanges terminating short of the ends of said segments, and means for closing the joint from the point of termination of the flanges to the end, comprising a tongue extending circumferentially from one of the segmental portions overlapping the adjacent segmental portion and being spot welded to the adjacent segmental portion.

3. An exhaust manifold comprising a plurality of aligned sections, each section composed of a plurality of segmental portions having mating radial flanges secured to one another by spot welding therethrough, said flanges terminating short of the ends of said segments, a telescopic joining sleeve clamped around the adjacent ends of adjacent sections and slidable axially with respect to one of them, and means comprising a circumferential band of metal spot welded to one of the sections adjacent the end thereof adapted to cooperate with an internal annular recess in said joining sleeve for axially locating the sleeve with respect to one of the sections.

JOHN C. WHITESELL, JR.
ENEA BOSSI.